United States Patent
Bultez et al.

(10) Patent No.: US 10,401,828 B2
(45) Date of Patent: Sep. 3, 2019

(54) METHOD FOR DEDUCING GEOMETRICAL DEFECTS OF AN OPTICAL ARTICLE TURNING MACHINE

(71) Applicant: ESSILOR INTERNATIONAL (COMPAGNIE GENERALE D'OPTIQUE), Charenton-le-Pont (FR)

(72) Inventors: Xavier Bultez, Charenton-le-Pont (FR); Jerome Moine, Charenton-le-Pont (FR); Guillaume Bolteau, Charenton-le-Pont (FR); Jean-Pierre Chauveau, Charenton-le-Pont (FR)

(73) Assignee: ESSILOR INTERNATIONAL, Charenton-le-Pont (FR)

( * ) Notice: Subject to any disclaimer, the term of this patent is extended or adjusted under 35 U.S.C. 154(b) by 253 days.

(21) Appl. No.: 15/502,921

(22) PCT Filed: Aug. 7, 2015

(86) PCT No.: PCT/EP2015/068296
§ 371 (c)(1),
(2) Date: Feb. 9, 2017

(87) PCT Pub. No.: WO2016/023834
PCT Pub. Date: Feb. 18, 2016

(65) Prior Publication Data
US 2017/0235295 A1    Aug. 17, 2017

(30) Foreign Application Priority Data

Aug. 13, 2014   (EP) .................................... 14306273

(51) Int. Cl.
*G05B 19/404* (2006.01)
*G01M 11/02* (2006.01)
(Continued)

(52) U.S. Cl.
CPC ............ *G05B 19/404* (2013.01); *G01M 11/02* (2013.01); *G01M 99/005* (2013.01); *G02C 7/02* (2013.01);
(Continued)

(58) Field of Classification Search
CPC ...... G05B 19/4083; G05B 2219/37576; G05B 2219/49174; G05B 2219/50057;
(Continued)

(56) References Cited

U.S. PATENT DOCUMENTS 6,071,176 A * 6/2000 Kruis .................... B24B 1/00
33/28
9,254,615 B2 * 2/2016 Gourraud .............. B24B 13/005
(Continued)

FOREIGN PATENT DOCUMENTS

| CN | 103 759 685 A | 4/2014 |
|---|---|---|
| EP | 1 719 584 A1 | 11/2006 |
| WO | 2014/080207 A2 | 5/2014 |

OTHER PUBLICATIONS

International Search Report, dated Oct. 6, 2015, from corresponding PCT application.

*Primary Examiner* — Chun Cao
(74) *Attorney, Agent, or Firm* — Young & Thompson (57) ABSTRACT

Disclosed is a method for deducing geometrical defects of an optical article turning machine, including a defect value deducing step, during which at least one geometrical defect value is deduced based at least on an indicative information of an optical and/or geometrical data related to an optical and/or geometrical characteristic of a checking piece (10).

9 Claims, 4 Drawing Sheets

(51) Int. Cl.
*G02C 7/02* (2006.01)
*G01M 99/00* (2011.01)

(52) U.S. Cl.
CPC .............. *G05B 2219/37576* (2013.01); *G05B 2219/37619* (2013.01); *G05B 2219/45136* (2013.01); *G05B 2219/45157* (2013.01); *G05B 2219/50057* (2013.01)

(58) Field of Classification Search
CPC ........ G05B 2219/50058; G05B 19/401; G05B 2219/45148; G05B 2219/45157; G05B 2219/50033; G05B 19/404
USPC .................................................. 700/157, 159
See application file for complete search history.

(56) References Cited

U.S. PATENT DOCUMENTS

| | | | | |
|---|---|---|---|---|
| 2004/0263840 A1* | 12/2004 | Segall | .................... | G01B 11/02 356/243.1 |
| 2005/0260343 A1* | 11/2005 | Han | ........................ | B24B 13/00 427/164 |
| 2006/0253220 A1* | 11/2006 | McPherson | ........... | B24B 13/005 700/176 |
| 2007/0062271 A1 | 3/2007 | Vassard et al. | | |
| 2012/0215341 A1 | 8/2012 | Gu et al. | | |

\* cited by examiner

METHOD FOR DEDUCING GEOMETRICAL DEFECTS OF AN OPTICAL ARTICLE TURNING MACHINE

FIELD OF THE INVENTION

The invention relates to the manufacturing of optical articles, such as lenses and in particular ophthalmic lenses, and also in particular to the deducing of geometrical defects of a turning machine configured for machining such optical articles.

BACKGROUND ART

It is already known a digital surfacing process control which is based on a statistical control concept of a method of manufacturing ophthalmic lenses.

The process control comprises the steps of manufacturing a checking piece periodically, controlling certain characteristics on the checking piece and deducing, according to said certain characteristics, the root of a defect in the digital surfacing machine by using control charts associated with troubleshooting defects.

SUMMARY OF THE INVENTION

The invention is directed to a method for determining geometrical defects of a turning machine configured for machining ophthalmic lenses, the method being particularly simple, convenient and economical to carry out.

The invention accordingly provides a method for deducing geometrical defects of an optical article turning machine, comprising a defect value deducing step, during which at least one geometrical defect value is deduced based at least on an indicative information of an optical and/or geometrical data related to an optical and/or geometrical characteristic of a checking piece.

The method according to the invention allows checking if the turning machine is able to manufacture optical articles without a defect at the center of the surface of the articles machined.

According to features preferred as being very simple, convenient and economical for embodying the method according to the invention:

- the method further comprises a checking piece measuring step, wherein the information indicative of an optical and/or geometrical data is obtained by measuring said checking piece by using a measuring device on a checking piece;
- the checking piece measuring step is done on a checking piece manufacturing side;
- the optical article is an ophthalmic lens and wherein the at least one geometrical defect value is at least one of a perpendicular defect, a calibration defect and a parallelism defect; and/or
- the optical and/or geometrical characteristic of the checking piece is predetermined based at least on an information indicative of the at least one geometrical defect to be deduced.

According to a preferred embodiment, the at least one geometrical defect value is deduced based at least on an information indicative of optical and/or geometrical data related to an optical and/or geometrical characteristics of a plurality of checking pieces.

In particular, the invention may provide a method for deducing and/or determining geometrical defects of a turning machine configured for machining ophthalmic lenses by using a lens machining tool acting in three directions in said turning machine, said method comprising the steps of manufacturing at least a checking piece and receiving data representative of characteristics of said checking piece, said method being characterized in that:

- said step of manufacturing comprises, successively, in any order, the steps of manufacturing a first checking piece according to a first predetermined theoretical geometry at a first height in said turning machine, manufacturing a second checking piece according to a second predetermined theoretical geometry different from said first predetermined theoretical geometry, at a second height in said turning machine, and manufacturing a third checking piece according to a third predetermined theoretical geometry different from said first predetermined theoretical geometry and from said second predetermined theoretical geometry, at a third height in said turning machine, distinct from said first height and second height;
- said step of receiving data comprises the step of measuring optical and/or geometrical data representative of optical and/or geometrical characteristics of each of said first checking piece, second checking piece and third checking piece; and
- said method further comprises the step of deducing, from said measured optical and/or geometrical data, a perpendicular defect value of said turning machine, according to a first direction and to a second direction amongst said three directions, a calibration defect value of said turning machine, according to said first direction, and a parallelism defect value of said turning machine, according to said first direction.

The method according to the invention allows checking if the turning machine is able to manufacture optical articles without a defect at the center of the surface of the articles machined.

Such a defect is created if the turning machine has a perpendicular defect and/or a calibration defect and/or a parallelism defect.

What is difficult to highlight, is a perpendicular defect distinct from a calibration defect because the results generated on the articles can be similar.

Due to the manufacturing of three checking pieces having each a predetermined theoretical geometry, the method according to the invention is able to precisely highlight, further to a parallelism defect, a calibration defect and a perpendicular defect distinct from the calibration defect, while being particularly simple, convenient and economical to carry out.

The first direction corresponds here to a direction named X-direction while the second direction corresponds here to a direction named Z-direction. The Z-direction here corresponds to the turning axis, also named turning center, of the respective checking pieces. There is also a third direction which corresponds to a direction here named Y-direction.

Further, the lens machining tool has preferably an offset location according to the third direction, relative to a theoretical location, which is smaller than a predetermined threshold.

It should be noted that the first and second directions may be variable during the manufacturing of the lens, in particular depending on the kinematics of the machine. It can be defined an instantaneous first direction and second direction where the tool reaches the center of the lens/calibration piece manufactured. Moreover, the perpendicularity in particular relative between the first direction and the second direction is also defined where the tool reaches the center of the lens/calibration piece manufactured.

Features preferred as being very simple, convenient and economical for embodying the method according to the invention are mentioned below.

The step of measuring optical and/or geometrical data may be carried out by using a lens mapper which is configured to provide optical data.

Said lens mapper may be configured to provide as results values in diopter of overall optical power defects of said first, second and third checking pieces.

Said lens mapper may be configured to graphically provide measured optical data representative of local optical power errors of said first, second and third checking pieces, respectively, which local optical power errors may correspond each to a peak or a valley in a two-dimensional graphical representation, and said optical data and in particular said values in diopter of said overall optical power defects may be determined from graphics values corresponding to opposite ends of said peak or valley at a center of said first, second and third checking pieces, respectively.

Said second and third checking pieces may have each an average curvature at their respective center which is equal or greater than around 2 dpt.

Said lens mapper may be configured to graphically provide measured optical data representative of gradient of optical power of each of said first, second and third checking pieces, and said method may further comprise the step of deducing a shape defect value of said lens machining tool, according to said optical data representative of said gradient of optical power of at least one of said first, second and third checking pieces, which gradient of optical power corresponding to peaks or valleys in a two-dimensional graphical representation showing the first, second and third checking pieces in section, or to rings in a two-dimensional graphical representation showing in top view the respective first, second and third checking pieces.

The gradient of optical power may also correspond to peaks or valleys in a three-dimensional graphical representation on the whole lens surface.

Said turning machine may have an overall geometrical defect able to provide an overall optical power defect on optical articles machined, such as ophthalmic lenses or checking pieces, which may be defined by the following relationship:

$$D = d\text{perp} \times \text{coef}_{perp} + [dx0 + (Z-Z0) \times d\text{para}] \times C \times \text{coef}_{dx},$$

where:
- "D" is said overall optical power defect, in diopter;
- "dperp" is said perpendicular defect value according to said first and second directions, in degree;
- "coef_perp" is power error sensitivity according to a perpendicularity defect, in diopter by degree;
- "dx0" is said calibration defect value according to said first direction in micron;
- "coef_dx" is power error sensitivity according to a calibration defect, in micron$^{-1}$;
- "Z" and "Z0" are heights at which at least two optical articles are manufactured in millimeter;
- "dpara" is said parallelism defect value according to said first direction, in micron by millimeter; and
- "C" is an average curvature at a center of said optical articles, in diopter, preferably depending on the material of the optical article machined.

The overall geometrical defect of the turning machine includes at least one and preferably all the perpendicular defect, calibration defect and parallelism defect of the turning machine.

Said first, second and third checking pieces may have each an overall optical power defect defined by the following respective relationships:

$$D1 = d\text{perp} \times \text{coef}_{perp} + dx1 \times C1 \times \text{coef}_{dx};$$

$$D2 = d\text{perp} \times \text{coef}_{perp} + [dx1 + (Z2-Z1) \times d\text{para}] \times C2 \times \text{coef}_{dx};$$

$$D3 = d\text{perp} \times \text{coef}_{perp} + [dx1 + (Z3-Z1) \times d\text{para}] \times C3 \times \text{coef}_{dx}.$$

The three relationships mentioned above are obtained by replacing the data "dx2" and "dx3" by functions of data "dx1", as explained below.

More generally, said three checking pieces can be expressed as follow:

$$D1 = d\text{perp} \times \text{coef}_{perp} + [dx1] \times C1 \times \text{coef}_{dx};$$

$$D2 = d\text{perp} \times \text{coef}_{perp} + [dx2] \times C2 \times \text{coef}_{dx};$$

$$D3 = d\text{perp} \times \text{coef}_{perp} + [dx3] \times C3 \times \text{coef}_{dx}.$$

The data "dx2" and "dx3" can be expressed as functions of the data "dx1", as follow:

$$dx2 = dx1(Z2-Z1) \times d\text{para};$$

$$dx3 = dx1 + (Z3-Z1) \times d\text{para}.$$

Said power error sensitivities according to perpendicularity and calibration defects may be predetermined according to the following steps:
- creating defects having each a predetermined value in said turning machine, respectively a perpendicular defect value or a calibration defect value;
- manufacturing for each defect created a checking piece according to a predetermined geometry;
- measuring optical and/or geometrical data representative of optical and/or geometrical characteristics of said checking piece;
- deducing, from said measured optical and/or geometrical data, a corresponding power error sensitivity according to a perpendicularity defect or a power error sensitivity according to a calibration defect, depending of said defect created; and
- storing a couple corresponding to said created defect value and said power error sensitivity which is associated.

Said power error sensitivities may be each defined as a function of said predetermined geometry of said checking piece.

The checking pieces manufactured may be similar to at least one of said first and second pieces, depending on said defect created.

Said power error sensitivity according to a perpendicularity defect may have a predetermined value and said first checking piece may have a first predetermined average curvature at its center, which is equal to zero; so that said perpendicular defect value may be directly deduced from said measured optical and/or geometrical data representative of optical and/or geometrical characteristics of said first checking piece.

Said power error sensitivity according to a calibration defect may have a predetermined value and said second checking piece may have a second predetermined average curvature at its center, distinct from said first predetermined average curvature, and said first height may be equal to or distinct from said second height; so that said calibration defect value at said second height may be deduced from said measured optical and/or geometrical data representative of optical and/or geometrical characteristics of said second checking piece, according to said deduced perpendicular defect value.

Said power error sensitivities according to perpendicularity and calibration defects may have predetermined values and said first checking piece may have a first predetermined average curvature at its center, which is different from zero, and said second checking piece may have a second average curvature at its center, distinct from said first predetermined average curvature and also different to zero, and said first height may be equal to said second height; so that said perpendicular defect value and said calibration defect value may be deduced from said measured optical and/or geometrical data representative of optical and/or geometrical characteristics of said first checking piece and of said second checking piece.

Said third checking piece may have a third average curvature at its center, equal to said second predetermined average curvature and distinct from said first predetermined average curvature; so that said parallelism defect value may be deduced from said measured optical and/or geometrical data representative of optical and/or geometrical characteristics of said third checking piece, according to said deduced perpendicular defect value and said deduced calibration defect value.

Said turning machine may be configured for machining ophthalmic lenses having a vision control point which coincides with a turning center of said ophthalmic lenses.

Each of the steps of manufacturing said first, second and third checking pieces, respectively, may comprise the following steps:
- blocking first, second and third checking blanks, respectively, in respective lens holding systems;
- machining by rough cutting and/or finishing said first, second and third checking blanks, respectively;
- polishing said machined first, second and third checking blanks, respectively, for obtaining said first, second and third checking pieces, respectively; and
- unblocking said first, second and third checking pieces, respectively, from said respective lens holding systems.

BRIEF DESCRIPTION OF THE DRAWINGS

The description of the invention now continues with a detailed description of a preferred embodiment given hereinafter by way of non-limiting example and with reference to the appended drawings. In these drawings.

DETAILED DESCRIPTION OF PREFERRED EMBODIMENTS

Figure 1:
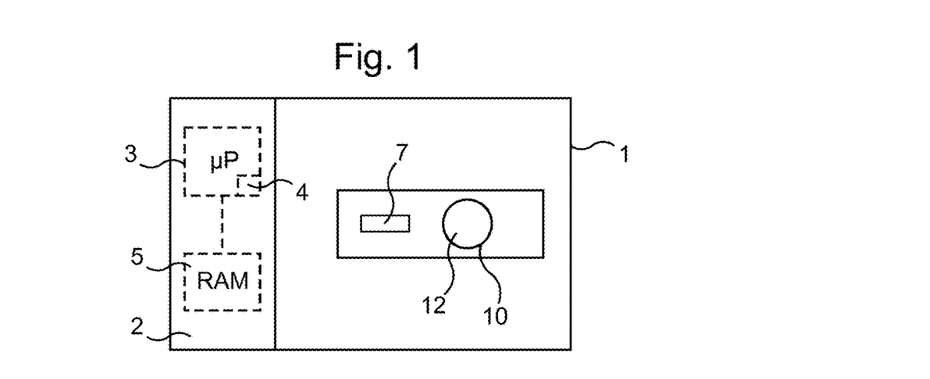
FIG. 1 is a partial and schematically view of a turning machine configured for machining an optical article and for deducing geometrical defects of the turning machine.

FIG. 1 shows a numerical-control "free-form" machine 1, numerical control denoting the set of equipment and software, the function of which is to give movement instructions to all the elements of the machine 1.

This machine 1 is configured for machining by turning (surfacing and optionally polishing) a face 12 of an optical article 10.

To this end, the machine 1 comprises a moveable machining arm 7 and a control unit 2 comprising a microprocessor 3 having a memory 4, in particular a non-volatile memory, allowing it to load and store software, in other words a computer program, which when it is executed in the microprocessor 3, allows the implementation of a manufacturing method according to the invention.

This non-volatile memory 4 is for example of the ROM ("read only memory") type.

The control unit 2 further comprises a memory 5, in particular a volatile memory, allowing data to be stored during the execution of the software and the implementation of the method.

This volatile memory 5 is for example of the RAM or EEPROM type (respectively "random access memory" and "electrically erasable programmable read only memory").

The control unit may be only at least partially integrated into the machine. In other words, the control unit may be arranged in part, or in whole, outside the machine.

The machine 1 can also correspond more generally to a manufacturing system comprising one or a plurality of machines configured for carrying out determined steps on the optical article (see below). Thus, the control unit forms a part of the manufacturing system and may comprise one or a plurality of control modules located inside or outside the machines.

The optical article 10 can be an ophthalmic lens and/or a checking piece.

In the case of an ophthalmic lens, the machine 1 can also be configured for polishing the face 12 and for edging a peripheral edge 13 (see FIG. 2) in order to form the ophthalmic lens.

The moveable machining arm 7 is configured to bear at an end a device 20 comprising a lens machining tool 24 (FIG. 2) and the control unit 2 is configured to control each of the steps of a method for deducing geometrical defects of the machine 1.

Figure 2:
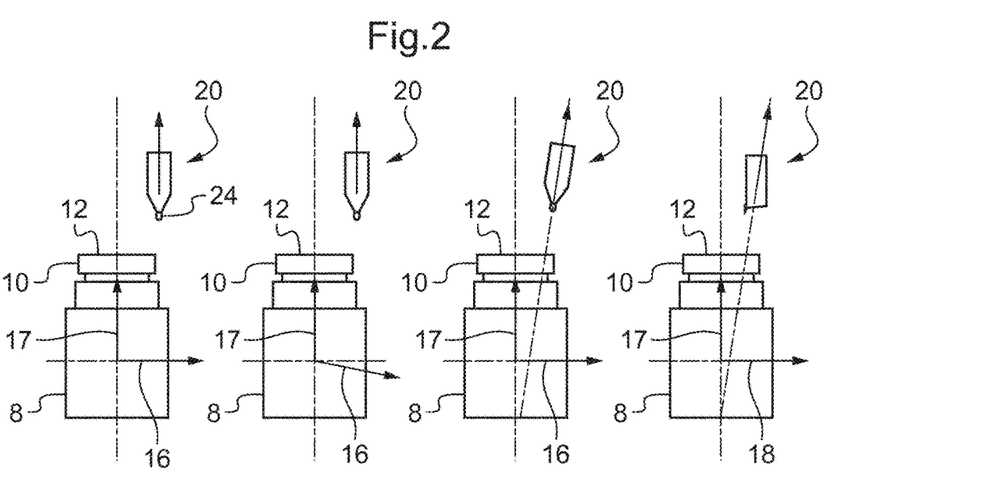
FIG. 2 represents the geometrical defects that can comprises the turning machine.

FIG. 2 shows a lens holding system 8 of the turning machine 1, which is configured to block in a predetermined position the optical article, here formed by a checking piece 10.

The checking piece 10 comprises an upper face 12, a lower face (not represented) opposite to the upper face 12 and a peripheral edge (not represented) linking the lower face and upper face 12.

The upper face 12 is configured to form a first face, also named rear face and the lower face is configured to form a second face, also named front face. The second face is opposite to the first face.

The peripheral edge is configured to form a peripheral outline having a first edge linking the peripheral edge to the first face 12 and a second edge linking the peripheral edge to the second face.

The lens holding system 8 comprises for instance an adhesive film (not represented) which has an adhesive face configured to be fixed on the lower face of the piece 10.

The lens holding system 8 is configured to receive the piece 10 for machining by turning at least the first face 12 by using the device 20.

The lens holding system 8 is configured to be mounted on a spindle axis (not represented) of the machine 1, spindle axis which rotates during the step of manufacturing the calibration piece 10, for rotating the piece 10 on itself during the machining.

The machine 1 comprises three directions, respectively a first direction 16, namely X-direction, a second direction 17 perpendicular to the first direction 16, namely Z-direction, and a third direction 18 perpendicular both to the first and second directions 16 and 17, namely Y-direction.

The location of the lens machining tool 24 is defined according to the three directions 16 to 18 in the turning machine 1.

The Z-direction 17 corresponds here to a turning axis, also named turning center, of the piece 10.

The device 20 comprises a pin (not represented) configured to be fastened to the moveable machining arm 7, a base (not represented) from which protrudes the pin, a tool support (not represented) formed by a projection of the base, at the opposite of the pin, and the lens machining tool 24 fixed to the tool support.

FIG. 2 shows different configurations of the machine 1, respectively (from the right to the left) wherein the machine 1 has a parallelism defect according to the Y-direction, wherein the machine 1 has a parallelism defect according to the X-direction, wherein the machine 1 has a perpendicular defect according to the X-direction and to the Z-direction, and wherein the machine 1 is devoid of a parallelism and perpendicular defects, but may have a calibration defect.

For carrying out the method for deducing geometrical defects of the machine 1 amongst the defects mentioned above, the control unit 2 is configured to control a step of deducing a defect value, during which at least one geometrical defect value is deduced based at least on an indicative information of an optical and/or geometrical data related to an optical and/or geometrical characteristic of a checking piece 10.

More precisely, the control unit 2 is configured to control a step of measuring the checking piece 10 on the first face 12 by a measuring device and a step of obtaining the information indicative of an optical and/or geometrical data from the measurements made.

The checking piece 10 is predetermined based at least on information indicative of the geometrical defect(s) to be deduced.

Preferably, the at least one geometrical defect value is deduced based at least on an information indicative of optical and/or geometrical data related to an optical and/or geometrical characteristics of a plurality of checking pieces.

For carrying out the method for deducing and/or determining geometrical defects of the machine 1 on the basis of a plurality of checking pieces machined by using the tool 24 acting the three directions 16 to 18, the control unit 2 can be configured to check if the tool 24 has an offset location according to the Y-direction, relative to a theoretical location, which is smaller than a predetermined threshold.

If no, the offset location according to the Y-direction of the tool 24 has to be corrected in order to be smaller than the predetermined threshold.

If yes, the control unit 2 is configured to control a step of manufacturing at least a checking piece 10 and preferably three checking pieces and a step of receiving data representative of characteristics of each of the three checking pieces.

Such an offset location dY can lead an error regarding the determination of the tool location 24 according to the X-direction, which can be translated to a local optical power error on the checking pieces 10.

Figure 3:
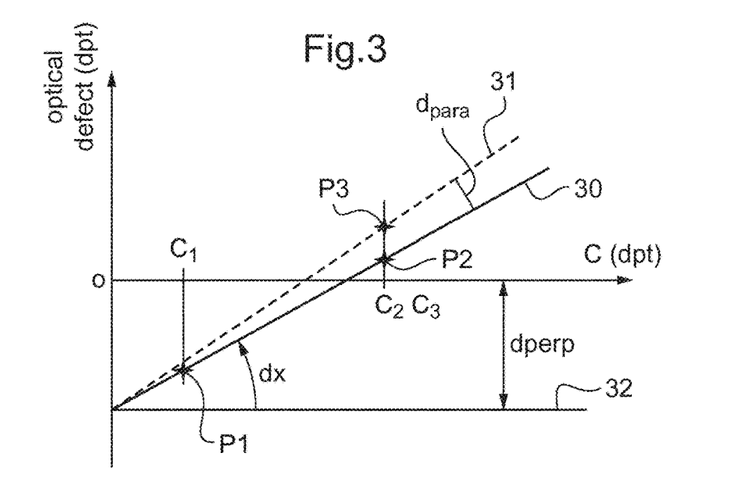
FIGS. 3 and 4 represent graphically an overall optical power defect on the optical article machined, according to two different embodiments of the method for deducing the geometrical defects.
Figure 4:
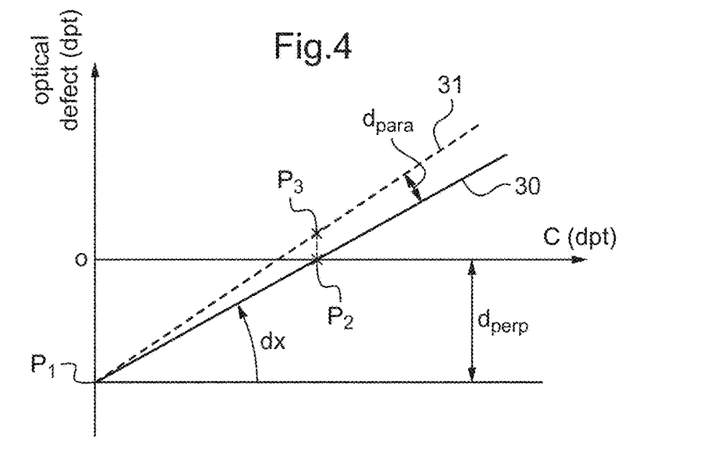

The control unit 2 is further configured to control, successively, in any order, each of the following steps of manufacturing:

a first checking piece, represented P1 on FIGS. 3 and 4, according to a first predetermined theoretical geometry at a first height in the machine 1;

a second checking piece, represented P2 on FIGS. 3 and 4, according to a second predetermined theoretical geometry different from the first predetermined theoretical geometry, at a second height in the machine 1; and a third checking piece according to a third predetermined theoretical geometry different from the first predetermined theoretical geometry and from the second predetermined theoretical geometry, at a third height in the machine 1.

The third height is distinct from each of the first height and of the second height.

The method described is particularly interesting in the case where ophthalmic lenses having a vision control point which coincides with a turning center of the ophthalmic lenses wish to be machined by using a machine without geometrical defect or having known and thus compensated geometrical defects. The geometrical defects may be compensated for instance by action on the data file defining the geometry of the ophthalmic lenses to be machined.

The second and third checking pieces P2 and P3 may have each an average curvature, respectively C2 and C3, at their respective center which is equal or greater than around 2 dpt.

The machine 1 may have an overall geometrical defect able to provide an overall optical power defect, represented D or DFp, in diopter, on the first checking piece P1, second checking piece P2 and third checking piece P3, each being machined by using the tool 24.

Next, the control unit 2 is configured to control a step of measuring optical and/or geometrical data representative of optical and/or geometrical characteristics of each of the first checking piece P1, second checking piece P2 and third checking piece P3.

As described above, the machine 1 can form a manufacturing system further comprising a lens mapper (not represented) for performing optical measurements. The lens mapper is thus configured to provide optical data.

The lens mapper is preferably configured to provide as results values in diopter of overall optical power defects of the first, second and third checking pieces, respectively P1, P2 and P3.

In particular, the lens mapper is here configured to graphically provide measured optical data representative of local optical power errors of the first, second and third checking pieces, respectively P1, P2 and P3.

The mentioned local optical power errors here correspond each to a peak or a valley in a two-dimensional graphical representation.

The control unit 2 is thus configured to control a step of deducing and/or determining the optical data and in particular the values in diopter of the overall optical power defects from the graphics values corresponding to opposite ends of the peak or valley at a center of the first, second and third checking pieces, respectively P1, P2 and P3 (see below more detail in reference to FIGS. 5 to 9).

Next, the control unit 2 is configured to control a step of deducing, from the measured optical and/or geometrical data:
- a perpendicular defect value of the machine 1, according to the X-direction and to the Z-direction;
- a calibration defect value of the machine 1, according to the X-direction; and
- a parallelism defect value of the machine 1, according to the X-direction.

The overall optical power defect on the checking pieces and more generally on the optical articles machined, may be defined by the following relationship:

$$D = d\text{perp} \times \text{coef}_{perp} + [dx0 + (Z-Z0) \times d\text{para}] \times C \times \text{Coef}_{dx},$$

where:
- "D" is the overall optical power defect, in diopter;
- "dperp" is the perpendicular defect value according to the X-direction and to the Z-direction, in degree;
- "coef_perp" is the power error sensitivity according to a perpendicularity defect, in diopter by degree;
- "dx0" is the calibration defect value according to the X-direction in micron;
- "coef_dx" is the power error sensitivity according to a calibration defect, in micron$^{-1}$;
- "Z" and "Z0" are heights at which at least two optical articles are machined (here the checking pieces P2 and P3, see in detail above), in millimeter;
- "dpara" is the parallelism defect value according to the first direction, in micron by millimeter; and
- "C" is the average curvature at the center of the optical articles or checking pieces, in diopter, preferably depending on the material of the optical articles or checking pieces machined.

In the case of the method here described, the first, second and third checking pieces, respectively P1, P2 and P3, may have each an overall optical power defect defined by the following respective relationships:

$$D1 = d\text{perp} \times \text{coef}_{perp} + [dx1] \times C1 \times \text{coef}_{dx};$$

$$D2 = d\text{perp} \times \text{coef}_{perp} + [dx2] \times C2 \times \text{coef}_{dx};$$

$$D3 = d\text{perp} \times \text{coef}_{perp} + [dx3] \times C3 \times \text{coef}_{dx}.$$

The data "dx2" and "dx3" can be expressed as functions of the data "dx1", as follow:

$$dx2 = dx1 + (Z2-Z1) \times d\text{para};$$

$$dx3 = dx1 + (Z3-Z1) \times d\text{para}.$$

By replacing the data "dx2" and "dx3" by functions of data "dx1", as explained below, the overall optical power defects of the first, second and third checking pieces, respectively P1, P2 and P3 can thus be defined by the following respective relationships:

$$D1 = d\text{perp} \times \text{coef}_{perp} + dx1 \times C1 \times \text{coef}_{dx};$$

$$D2 = d\text{perp} \times \text{coef}_{perp} + [dx1 + (Z2-Z1) \times d\text{para}] \times C2 \times \text{coef}_{dx};$$

$$D3 = d\text{perp} \times \text{coef}_{perp} + [dx1 + (Z3-Z1) \times d\text{para}] \times C3 \times \text{coef}_{dx}.$$

The above mentioned relationships which define overall optical power defects of the three checking pieces are graphically represented in FIGS. 3 and 4, according to two respective embodiments of the method for deducing the geometrical defects, described below.

The power error sensitivities may be each defined as a function of the predetermined geometry of the checking pieces, respectively P1, P2 and P3.

The control unit 2 is configured to control, before each step of machining a respective checking piece, a step of blocking a respective first, second and third checking blanks, respectively, in a respective lens holding system.

Next, the control unit 2 is configured to control a step of rough cutting and/or of finishing the first, second and third checking blanks, respectively.

The control unit 2 is further configured to control a step of polishing the machined first, second and third checking blanks, respectively, for obtaining the first, second and third checking pieces, respectively P1, P2 and P3.

Next, the control unit 2 is configured to control a step of unblocking the first, second and third checking pieces, respectively P1, P2 and P3, from the respective support blanks; before the respective steps of measuring optical data representative of optical characteristics of each of the first checking piece P1, second checking piece P2 and third checking piece P3, by using the lens mapper, as described above.

In an embodiment of the present invention (FIG. 3), the power error sensitivity according to the perpendicularity defect, coef_perp, has a predetermined value and the power error sensitivity according to the calibration defect coef_dx has also a predetermined value.

The first checking piece P1 has a first predetermined average curvature C1 at its center, which is different to zero, and is machined at a predetermined first height Z0.

The second checking piece P2 has a second predetermined average curvature C2 at its center, distinct from the first predetermined average curvature C1, and also different to zero, and is machined at a predetermined second equal to the predetermined first height Z0.

In this case, the perpendicular defect value dperp and the calibration defect value dx (dx1 and dx2 which are equal because at the same height) is deduced from the measured optical data representative of optical characteristics of the first checking piece P1 and of the second checking piece P2.

The points representatives of P1 and P2 can be placed in the graphic and a line 30 passing through the points P1 and P2 and representative of an overall optical power defect defined by a perpendicular defect dperp and by a calibration defect dx, at a first/second height can be drawn. The line 30 is extended until intersect the optical defect axis on the left of the graphic and the line 32 can be drawn from this intersection, in parallel of the C axis of the graphic. The line 32 is representative of an overall optical power defect defined by a pure perpendicular defect dperp.

In this embodiment, the third checking piece P3 has a third average curvature C3 at its center, equal to the second predetermined average curvature C2 and distinct from the first predetermined average curvature C1.

The parallelism defect value dpara is thus deduced from the measured optical data representative of optical characteristics of the third checking piece P3, according to the deduced perpendicular defect value dperp and the deduced calibration defect value dx.

Having placed the points P1 and P2 and knowing the third predetermined average curvature C3 (equal to C2), a point representative of P3 can be placed in the graphic and a line 31 representative of an overall optical power defect defined by a (known) perpendicular defect dperp and by a calibration defect dx3 at a third height can be drawn.

In another embodiment of the present invention (FIG. 4), the power error sensitivity according to the perpendicularity defect, coef_perp, has a predetermined value.

The first checking piece P1 has a first predetermined average curvature C1 at its center, which is equal to zero, and is machined at a predetermined first height Z0.

In this case, the perpendicular defect value dperp is directly deduced from the measured optical data representative of optical characteristics of the first checking piece P1.

A point representative of P1 can be placed in the graphic and a line 32 representative of an overall optical power defect caused by a pure perpendicular defect dperp can be drawn.

In this embodiment, the power error sensitivity according to the calibration defect coef_dx has a predetermined value.

The second checking piece P2 has a second predetermined average curvature C2 at its center, distinct from the first predetermined average curvature C1, and is machined at a predetermined second height, preferably equal to the predetermined first height Z0. In variant, the predetermined second height is distinct from the predetermined first height Z0.

The calibration defect value dx (or dx2) at the second height in the machine 1 is thus deduced from the measured optical data representative of optical geometrical characteristics of the second checking piece P2, according to the deduced perpendicular defect value dperp.

Having placed the point P1 and knowing the second predetermined average curvature C2, a point representative of P2 can be placed in the graphic and a line 30 representative of an overall optical power defect defined by a (known) perpendicular defect dperp and by a calibration defect dx, at a first/second height can be drawn.

In this embodiment, the third checking piece P3 has a third average curvature C3 at its center, equal to the second predetermined average curvature C2 and distinct from the first predetermined average curvature C1.

The parallelism defect value dpara is thus deduced from the measured optical data representative of optical characteristics of the third checking piece P3, according to the deduced perpendicular defect value dperp and the deduced calibration defect value dx.

Having placed the points P1 and P2 and knowing the third predetermined average curvature C3 (equal to C2), a point representative of P3 can be placed in the graphic and a line 31 representative of an overall optical power defect defined by a (known) perpendicular defect dperp and by a calibration defect dx3 at a third height can be drawn.

The method for deducing and/or determining geometrical defects of the machine 1 on the basis of a plurality of checking pieces machined by using the tool 24 acting the three directions 16 to 18 may need a reference calibration step in which predetermined defects are created in the machine 1.

The machine 1 and the tool 24 are used for machining reference checking pieces and the lens mapper is also used make the measurements on the reference checking pieces.

The reference checking pieces may be similar at least to the first and second checking pieces, depending on the defect created.

The power error sensitivities according to perpendicularity and calibration defects, respectively coef_perp and coef_dx, have each a predetermined value.

The control unit 2 is configured to control a step of creating defects in the machine 1, having each a predetermined value, respectively a perpendicular defect value dperp or a calibration defect value dx.

Next, the control unit 2 is configured to control a step of manufacturing for each defect created a reference checking piece according to a predetermined geometry.

The control unit 2 is further configured to control a step of measuring optical data representative of optical characteristics of the reference checking pieces, with the lens mapper.

Results of the measurements made by the lens mapper are illustrated on FIGS. 5 to 9.

Figure 5:
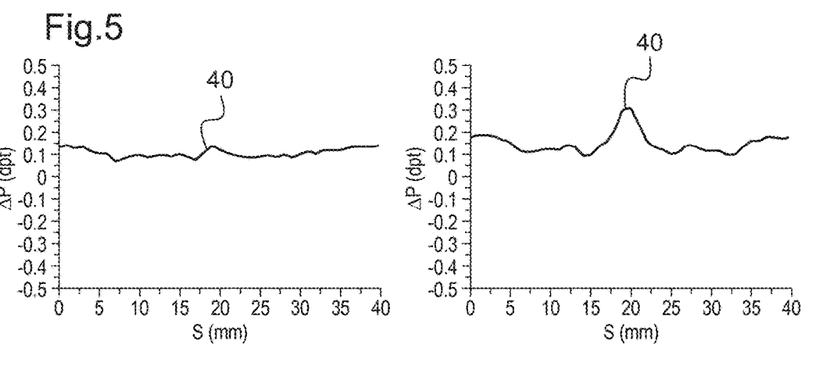
FIGS. 5 and 6 shows graphically the overall optical power along the optical article machined, according to known calibration defect values of the turning machine and/or to known average curvature values of a rear face of the optical article machined.
Figure 6:
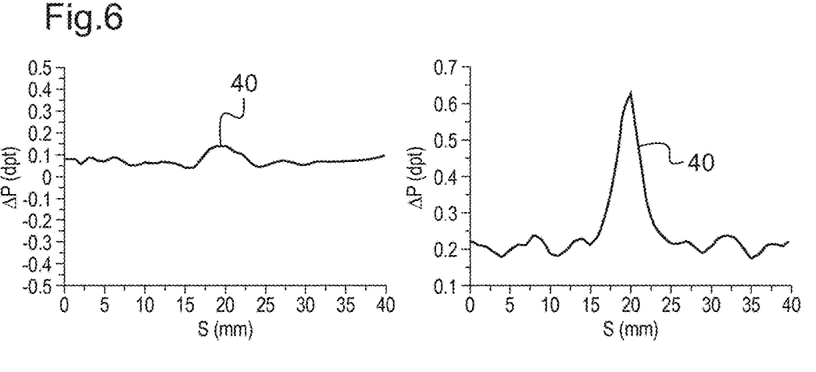

In particular, each of FIGS. 5 and 6 shows graphically the overall optical power P along the section of two reference checking pieces machined, when a calibration defect has been created in the machine 1. The calibration defect is not visible on a geometrical plane.

On the left of FIG. 5, the created calibration defect value dx is equal to around 20 µm and on the right of FIG. 5, the calibration defect value dx is equal to around 60 µm.

The two reference checking pieces machined have a similar predetermined average curvature.

The defect is characterized by a gradient of power, relative to the theoretical geometry, at the center of the piece; and shown by a peak 40 in the graphics. The value of the overall optical power defect, in diopter, is determined from the opposite ends of the peak 40.

The distance between the opposite ends of the peak 40 when the created defect has a value equal to 20 µm is smaller than the distance between the opposite ends of the peak 40 when the created defect has a value equal to 60 µm.

FIG. 6 shows that the graphically results also depend on the average curvatures of the face of the pieces.

Here, the created calibration defect value dx on the two reference checking pieces is equal to around 40 µm.

On the left of FIG. 6, the average curvature value of the reference checking piece is equal to around −2 dpt and on the right of FIG. 6, the average curvature value of the reference checking piece is equal to around −8 dpt.

In the same manner as described above, the defect is characterized by a gradient of power, relative to the theoretical geometry, at the center of the piece; and shown by as a peak 40 in the graphics. The value of the overall optical power defect, in diopter, is also determined from the opposite ends of the peak 40.

The distance between the opposite ends of the peak 40 when the average curvature value of the reference checking piece is equal to around −2 dpt is smaller than the distance between the opposite ends of the peak 40 when the average curvature value of the reference checking piece is equal to around −8 dpt.

Figure 7:
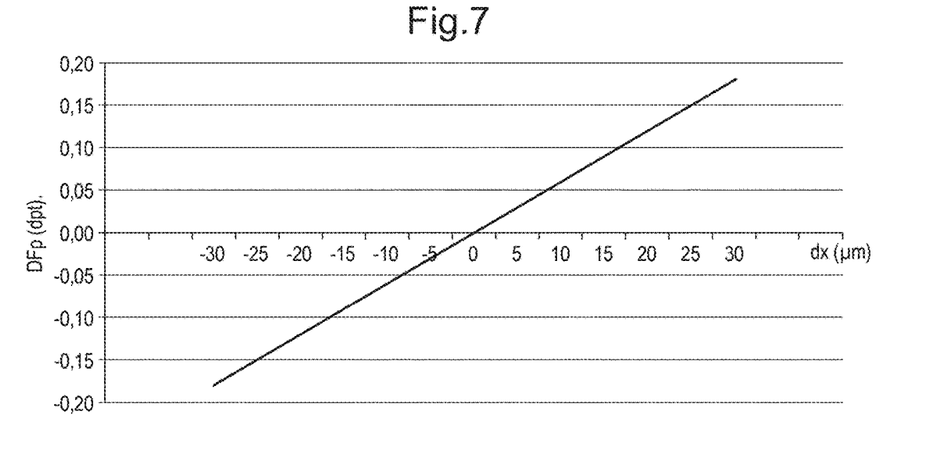
FIG. 7 shows graphically the overall optical power defect on the optical article machined, as a function of a calibration defect value and according to a known average curvature value of the rear face of the optical article machined.

FIG. 7 shows graphically the variation of the distance between the opposite ends of the peak 40 measured on a reference calibration piece machined, as a function of the calibration defect value and according to a known average curvature value of the piece, respectively −8 dpt.

Figure 8:
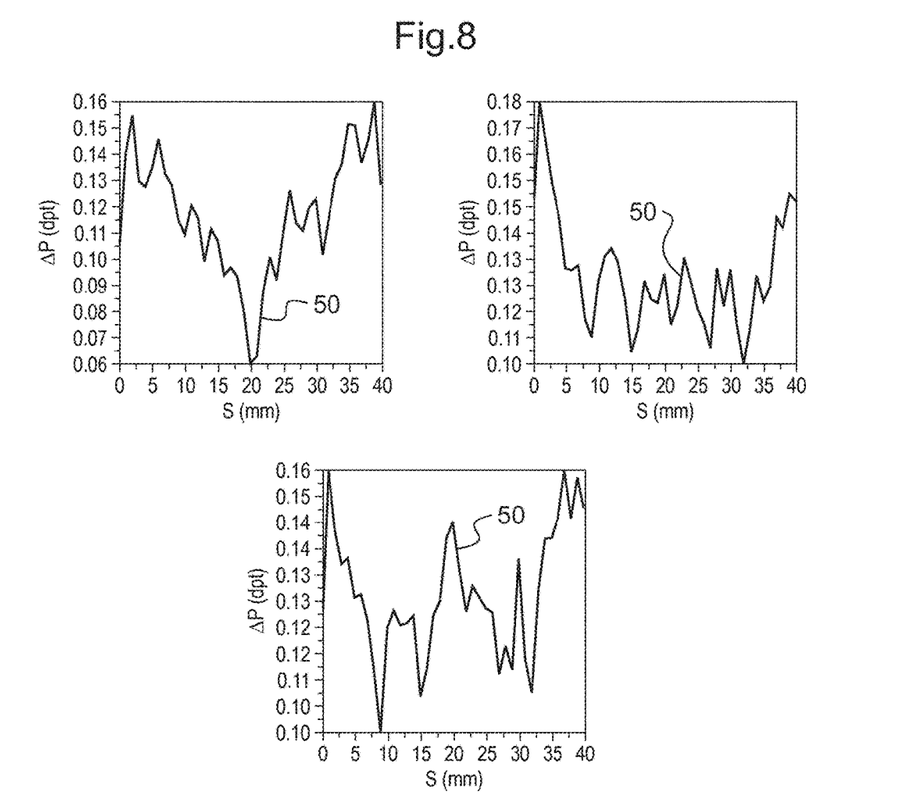
FIG. 8 shows graphically the overall optical power along the optical article machined, according to known perpendicular defect values of the turning machine.

FIG. 8 shows graphically the overall optical power P along the section of three reference checking pieces machined, when a perpendicular defect has been created in the machine 1. The perpendicular defect is visible on a geometrical plane, contrary to the calibration defect.

The three reference checking pieces machined have a similar predetermined average curvature.

On the top left of FIG. 8, the created perpendicular defect value dperp is equal to around −0.01°, on the top right of FIG. 8, the created perpendicular defect value dperp is equal to around +0.002°, and on the bottom of FIG. 8, the created perpendicular defect value dperp is equal to around +0.01°.

The defect is characterized by a gradient of power, relative to the theoretical geometry, at the center of the piece; and shown by a peak or a valley 50 in the graphics. The value of the overall optical power defect, in diopter, is determined from the opposite ends of the peak or valley 50.

When the perpendicular defect has a negative value, the defect is characterized by a gradient of power graphically shown by a valley; while when the perpendicular defect has a positive value, the defect is characterized by a gradient of power graphically shown by a peak. Furthermore, when the perpendicular defect is close to zero (here the case dperp=+0.002°), the distance between the opposite ends of the peak (or valley is the value is negative) is very small.

Figure 9:
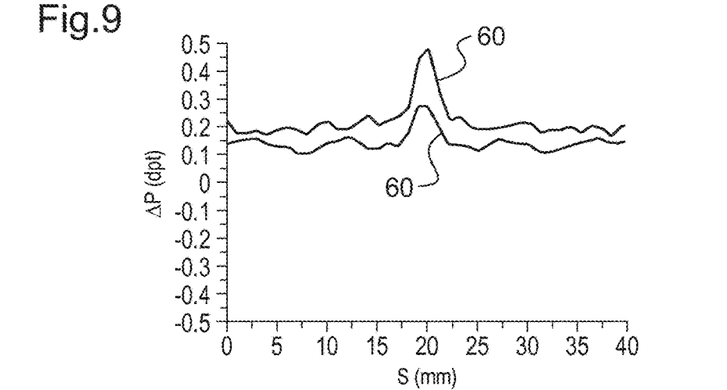
FIG. 9 show graphically the overall optical power along two optical articles machined at different heights in the machine.

FIG. 9 shows graphically the overall optical power along two reference calibration pieces machined at different heights H1 and H2 in the machine 1, when a calibration defect has been created in this machine 1 at the height H1; in order to illustrate a parallelism defect in the machine 1.

The two reference checking pieces machined have a similar predetermined average curvature or at least a similar geometry.

The defect is characterized by a gradient of power, relative to the theoretical geometry, at the center of the piece; and shown by a peak 60 in the graphics. The value of the overall optical power defect, in diopter, is determined from the opposite ends of the peak 60.

The distance between the opposite ends of the peak 60 when the reference checking piece is machined at the height H1 is smaller than the distance between the opposite ends of the peak 60 when the reference checking piece is machined at the height H2.

Next, the control unit 2 is configured to control a step of deducing, from the measured optical data, corresponding power error sensitivity according to a perpendicularity defect coef_perp or power error sensitivity according to a calibration defect coef_dx, depending of the defect created.

The control unit 2 is further configured to control a step of storing a couple corresponding to the created defect value and the power error sensitivity which is associated.

The lens mapper is also configured to graphically provide measured optical data representative of gradient of optical power of the checking pieces machined.

In this case, the control unit 2 can also be configured to control, after the step of deducing from the measurements at least a defect value amongst a perpendicular and/or a calibration and/or a parallelism defect values, a step of deducing a shape defect value of the tool 24, according to the optical data representative of the gradient of optical power of the checking pieces.

Figure 10:
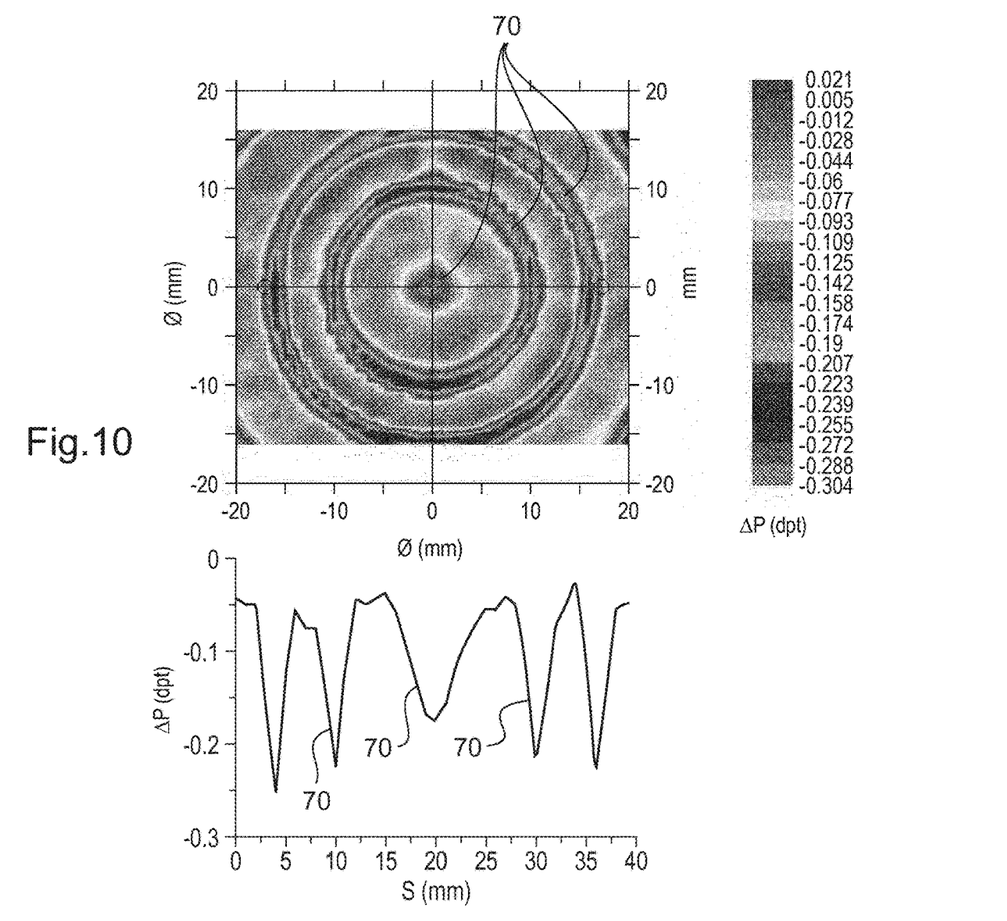
FIG. 10 shows graphically the effect of a shape defect value of the lens machining tool.

FIG. 10 shows graphically the shape defect value of the lens machining tool 24.

On the top of FIG. 10, the gradient of optical power corresponds to rings 70 in a two-dimensional graphical representation showing the checking piece in top view along the diameter of the checking piece.

On the bottom of FIG. 10, the gradient of optical power corresponds to valleys 70 rather than rings, also in a two-dimensional graphical representation showing the checking piece in section.

According to another embodiment not represented, the control unit 2 is configured to control a first step of rough cutting and/or finishing the entire main surface of a face of a calibration piece according to a predetermined general shape and next, successively to the first step, a second step of forming an annular groove in this face.

In this case, before the first step rough cutting and/or finishing, the control unit 2 is configured to check if the tool has an offset location according to the Y-direction, relative to a theoretical location, which is smaller than a predetermined threshold (as described above).

The first step is configured to provide a planar face of the checking piece and the second step is configured to provide a at least partially annular groove in a main surface formed in a face of the piece, which groove is centered relative to the turning center of the piece.

The at least partially annular groove is configured to form at least one sharp edge defining a slope discontinuity on the main surface, and being easy to identify. The slope discontinuity defined by the sharp edge corresponds to a surface portion on the main surface which is continuous and not differentiable.

The groove is configured to have, in section, a profile which has the first sharp edge and the second sharp edge defining respectively a first slope discontinuity and a second slope discontinuity on the planar face; and which has the first local slope close to the first sharp edge, and the second local slope close to the second sharp edge and opposite to the first local slope.

The control unit 2 is further configured to control a step of measuring a first diameter of the groove at its first sharp edge and a second diameter of the groove at its second sharp edge; and a step of determining a half-sum of the measured diameters of the groove.

The control unit 2 is configured to control a step of comparing the measured data representative of geometrical characteristics of the sharp edges (diameters) of the groove to a theoretical data according to the predetermined theoretical geometry of the checking piece, which theoretical data has been previously received and stored by the control unit 2.

Next, the control unit 2 can be configured to control a step of deducing, from the result of the comparison, a calibration defect value according to the X-direction.

The control unit 2 may also be configured to control the step of manufacturing a checking piece as described above, at a first height, and after deducing the calibration defect value, a step of storing the calibration defect value according to the first height.

Next, the control unit 2 is configured to control a step of manufacturing another similar checking piece, at a second height, a step of measuring geometrical characteristics of the sharp edges of the groove of the another piece and a step of deducing, from the measured data representative of geometrical characteristics of the sharp edges, deducing a calibration defect value according to the second height.

The control unit 2 is further configured to control a step of comparing the deduced calibration defect values and a step of deducing a parallelism defect value according to the X-direction.

It should be more generally noted that the invention is not limited to the described and represented examples.

The invention claimed is:

1. A method for deducing geometrical defects of an optical article turning machine (1) that machines ophthalmic lenses by using a lens machining tool (24) that operates in three directions in said turning machine (1), comprising:
  a step of manufacturing three checking pieces (10); and
  a step of receiving data representative of optical and/or geometrical characteristics of said checking pieces, wherein said step of manufacturing comprises steps of
manufacturing a first checking piece according to a first predetermined theoretical geometry at a first height in said turning machine,
manufacturing a second checking piece according to a second predetermined theoretical geometry different from said first predetermined theoretical geometry, at a second height in said turning machine, and
manufacturing a third checking piece according to a third predetermined theoretical geometry different from said first predetermined theoretical geometry and from said second predetermined theoretical geometry, at a third height in said turning machine, distinct from said first height and second height,
wherein said step of receiving data comprises a step of measuring optical and/or geometrical data representative of the optical and/or geometrical characteristics of each of said first checking piece, said second checking piece, and said third checking piece, and
wherein a perpendicular defect value (dperp) of said turning machine is generated from said measured optical and/or geometrical data according to a first direction (16) and a second direction (17) amongst said three directions, a calibration defect value (dx) of said turning machine is generated from said measured optical and/or geometrical data according to said first direction (16), and a parallelism defect value (dpara) of said turning machine is generated from said measured optical and/or geometrical data according to said first direction (16).

2. The method according to claim 1, wherein the step of measuring optical and/or geometrical data is carried out by using a lens mapper which is configured to provide optical data.

3. The method according to claim 1, wherein said turning machine has an overall geometrical defect able to provide an overall optical power defect on optical articles machined, which is defined by the following relationship:

$$D = d\text{perp} \times \text{coef}_{perp} + [dx0 + (Z-Z0) \times d\text{para}] \times C \times \text{coef}_{dx},$$

where:
"D" is said overall optical power defect,
"dperp" is said perpendicular defect value according to said first and second directions,
"coef_perp" is a power error sensitivity according to a perpendicularity defect,
"dx0" is said calibration defect value according to said first direction,
"coef_dx" is a power error sensitivity according to a calibration defect,
"Z" and "Z0" are heights at which at least two optical articles are manufactured,
"dpara" is said parallelism defect value according to said first direction, and
"C" is an average curvature at a center of said optical articles.

4. The method according to claim 3, wherein said first, second and third checking pieces each have an overall optical power defect defined by the following respective relationships:

$$D1 = d\text{perp} \times \text{coef}_{perp} + dx1 \times C1 \times \text{coef}_{dx};$$

$$D2 = d\text{perp} \times \text{coef}_{perp} + [dx1 + (Z2-Z1) \times d\text{para}] \times C2 \times \text{coef}_{dx},$$

where $$dx1 + (Z2-Z1) \times d\text{para} = dx2,$$

and $$D3 = d\text{perp} \times \text{coef}_{perp} + [dx1 + (Z3-Z1) \times d\text{para}] \times C3 \times \text{coef}_{dx},$$

where $$dx1 + (Z3-Z1) \times d\text{para} = dx3.$$

5. The method according to claim 3, wherein said power error sensitivities according to perpendicularity and calibration defects (coef_perp, coef_dx) are predetermined according to the following steps:
creating defects having each a predetermined value in said turning machine (1), respectively a perpendicular defect value or a calibration defect value;
manufacturing for each defect created a checking piece according to a predetermined geometry;
measuring optical and/or geometrical data representative of optical and/or geometrical characteristics of said checking piece;
deducing, from said measured optical and/or geometrical data, a corresponding power error sensitivity according to a perpendicularity defect (coef_perp) or a power error sensitivity according to a calibration defect, depending of said defect created (coef_dx); and
storing a couple corresponding to said created defect value and said power error sensitivity which is associated.

6. The method according to claim 3, wherein said power error sensitivity according to a perpendicularity defect (coef_perp) has a predetermined value and said first checking piece has a first predetermined average curvature (C1) at its center, which is equal to zero, so that said perpendicular defect value (dperp) is directly deduced from said measured optical and/or geometrical data representative of optical and/or geometrical characteristics of said first checking piece.

7. The method according to claim 6, wherein said power error sensitivity according to a calibration defect (coef_dx) has a predetermined value and said second checking piece has a second predetermined average curvature (C2) at its center, distinct from said first predetermined average curvature (C1), and said first height is equal to or distinct from said second height, so that said calibration defect value (dx) at said second height is deduced from said measured optical and/or geometrical data representative of optical and/or geometrical characteristics of said second checking piece, according to said deduced perpendicular defect value (dperp).

8. The method according to claim 3, wherein said power error sensitivities according to perpendicularity and calibration defects (coef_perp, coef_dx) have predetermined values and said first checking piece has a first predetermined average curvature (C1) at its center, which is different from zero, and said second checking piece has a second average curvature (C2) at its center, distinct from said first predetermined average curvature (C1) and also different to zero, and said first height is equal to said second height, so that said perpendicular defect value (dperp) and said calibration defect value (dx) are deduced from said measured optical and/or geometrical data representative of optical and/or geometrical characteristics of said first checking piece and of said second checking piece.

9. The method according to claim 7, wherein said third checking piece has a third average curvature (C3) at its center, equal to said second predetermined average curvature (C2) and distinct from said first predetermined average curvature (C1), so that said parallelism defect value (dpara) is deduced from said measured optical and/or geometrical data representative of optical and/or geometrical characteristics of said third checking piece, according to said deduced perpendicular defect value (dperp) and said deduced calibration defect value (dx).

* * * * *